United States Patent
Rigney

(10) Patent No.: US 6,446,545 B2
(45) Date of Patent: Sep. 10, 2002

(54) FOOD COOKING APPARATUS WITH DRAIN SPIGOT

(75) Inventor: Donald P. Rigney, Belleville, IL (US)

(73) Assignee: Empire Comfort Systems, Inc., Belleville, IL (US)

( * ) Notice: Subject to any disclaimer, the term of this patent is extended or adjusted under 35 U.S.C. 154(b) by 0 days.

(21) Appl. No.: 09/853,146

(22) Filed: May 10, 2001

Related U.S. Application Data

(62) Division of application No. 09/593,223, filed on Jun. 14, 2000, now Pat. No. 6,269,737.

(51) Int. Cl.⁷ .............. A23L 1/00; A47J 27/00; A47J 27/04; A47J 27/10; A47J 37/12

(52) U.S. Cl. .............. 99/339; 99/336; 99/340; 99/403; 99/407; 99/410; 99/413; 99/414; 99/417; 126/369; 126/912

(58) Field of Search ............ 99/339, 340, 330–336, 99/403–418, 444–450, 483, 279, 300, 293, 291, 347, 306, 316, 290, 310; 222/145.5, 146.5, 413; D7/313, 308; 210/244–246, 464–469, 475, 477; 126/369, 369.1, 369.2, 390; 219/401, 437; 220/529, 912, 913, 23.87, 573.4, 625, 630; 426/510, 511, 523

(56) References Cited

U.S. PATENT DOCUMENTS

| | | | |
|---|---|---|---|
| 1,260,794 A | * | 3/1918 | Paquette |
| 1,272,222 A | | 7/1918 | Clayton |
| 1,554,612 A | * | 9/1925 | Wilson et al. ............ 99/279 |
| 1,909,983 A | | 5/1933 | Powell |
| 2,350,623 A | | 6/1944 | Kruea |
| 2,809,577 A | * | 10/1957 | Sill ............ 99/306 |

(List continued on next page.)

FOREIGN PATENT DOCUMENTS

| | | |
|---|---|---|
| CH | 178687 | 7/1935 |
| IT | 333782 | 1/1936 |

OTHER PUBLICATIONS

Pamphlet distributed by Barbour International, Inc. for *Bayou Classic* #4026 26 Quart Turkey Fryer, 3 pages, undated.

Pamphlet distributed by Empire Comfort Systems, Inc. for Turkey Fryer R–3094 cooking instructions effective Apr. 1997, 1 page.

Pamphlet distributed by Empire Comfort Systems for Superb cooking Products, Form No. 2301 dated Mar., 1997, 4 pages.

Publication, Domestic Cooking Vessels, Pots and Kettles, Jan. 1, 1914 No. 57 (unknown origin), 1 page.

*Primary Examiner*—Timothy F. Simone
(74) *Attorney, Agent, or Firm*—Thompson Coburn LLP

(57) ABSTRACT

A cooking apparatus includes a container, a spigot, a lid, and a food support. The container has a bottom surface and a side wall that extends upwardly from the bottom surface to a top edge of the side wall. The spigot is attached to the container side wall and has a valve member that is selectively positionable between opened and closed positions. The spigot valve member allows liquid contents of the container to drain from the container when in the opened position, and prevents the contents from draining out of the container when in the closed position. The food support is comprised of a perforated horizontal member with a perforated side wall extending upwardly from the horizontal member. A plurality of vertical members spaced around the periphery of the horizontal member extend upwardly from the horizontal member. The food support is dimensioned to fit within the interior of the container and some of the vertical members have top ends with integral support connectors that are adapted to engage with the side wall top edge to suspend the food support in a spaced relation from the container bottom surface.

28 Claims, 4 Drawing Sheets

U.S. PATENT DOCUMENTS

| | | | |
|---|---|---|---|
| 2,926,595 A | * 3/1960 | Hron | 99/310 |
| 3,713,378 A | 1/1973 | West et al. | |
| 3,808,963 A | * 5/1974 | Ludena | 99/413 X |
| 3,853,044 A | * 12/1974 | Albright et al. | 126/369 X |
| 3,971,304 A | * 7/1976 | Citkovich | 99/291 |
| 3,998,144 A | * 12/1976 | Curtis | 99/293 |
| 4,250,803 A | * 2/1981 | Wohlfart | 99/409 |
| 4,366,920 A | * 1/1983 | Greenfield, Jr. et al. | 99/285 |
| 4,574,776 A | * 3/1986 | Hidle | 126/369 |
| 4,604,989 A | * 8/1986 | Kita | 126/369 |
| 4,626,352 A | * 12/1986 | Massey et al. | 210/469 |
| 4,658,117 A | * 4/1987 | Sayward, Jr. | 219/437 |
| 4,951,558 A | * 8/1990 | Filiuzzi | 99/403 X |
| 4,957,039 A | * 9/1990 | Reyes | 99/340 |
| 5,106,642 A | 4/1992 | Ciofalo | |
| 5,211,105 A | * 5/1993 | Liu | 99/413 X |
| 5,235,904 A | * 8/1993 | Ludena | 99/417 X |
| 5,301,604 A | * 4/1994 | Takahashi | 99/407 |
| 5,320,028 A | 6/1994 | Grunberg | |
| 5,470,011 A | * 11/1995 | Jordan | 222/108 |
| 5,560,284 A | * 10/1996 | Weidman et al. | 99/281 |
| 5,584,235 A | * 12/1996 | DuBois et al. | 99/413 |
| 5,651,905 A | * 7/1997 | Thies et al. | 99/313 X |
| 5,758,569 A | 6/1998 | Barbour | |
| 5,896,810 A | 4/1999 | Barbour | |
| 6,269,737 B1 | * 8/2001 | Rigney et al. | 99/339 |

FOOD COOKING APPARATUS WITH DRAIN SPIGOT

This is a divisional patent application from patent application Ser. No. 09/593,223, filed Jun. 14, 2000, now U.S. Pat. No. 6,269,737.

BACKGROUND OF THE INVENTION (i) Field of the Invention

The present invention relates in general to cooking apparatus, and specifically to cooking apparatus designed for deep frying of poultry and other food items and for steaming or boiling food items.

(ii) Description of the Related Art

Typical deep frying food cooking apparatus (deep fryers) include a container in which oil is heated and a basket or food support on which food items are placed and then lowered into the heated oil in the container to be cooked. Prior art fryers include large fryers for cooking large items such as turkeys, which often have their own support stand and heat source, and smaller fryers for cooking smaller items that can be used on a kitchen stove top or countertop. When deep frying large food items, such as turkeys or other poultry items, or smaller items such as french fries, vegetables or fish, the user is exposed to the danger of large amounts of oil at very high temperatures, typically 350° F. or more. When inserting frozen food items or items that contain moisture into deep fryers containing hot oil, the high temperature oil causes the moisture to flash off the food items and thereby creates bubbling and turbulence within the hot oil which causes the hot oil to spatter, potentially burning the user of the fryer.

Typical prior art deep fryers include baskets with a handle that extends outward from the periphery of the basket so that a user may insert the basket into and remove the basket from the deep fryer with minimal exposure to the dangers of the spattering hot oil. The large prior art turkey or poultry fryers typically utilize a flat plate like food support which do not have the same outwardly extending handle of smaller fryers. Because of the large size of turkeys and poultry items and their associated weight, such a handle would not always provide a secure grip on the food support when inserting or removing the food support into or out of the hot oil. Therefore, the large prior art turkey and poultry fryer food supports typically have a center post that extends upwardly from the center of the food support to a top end of the post that is adapted to be connected to a handle of some type for inserting and removing the food support into and out of the hot oil. Typically, the center post also serves as a skewer upon which the turkey or poultry items are inserted so as to hold the turkey and poultry items in a centered orientation during the cooking process. These handle assemblies of prior art turkey and poultry fryers expose the user to the dangers of the spattering hot oil. Specifically, because the food supports are inserted and removed from the hot oil container by a handle that attaches to the center post of the food support, the user's hand(s) and arm(s) are exposed to the spattering hot oil when inserting the food into and when removing the food from the deep fryer. Therefore, these prior art fryers require the user to wear protective clothing such as long sleeve shirts and gloves and/or gloves with extended gauntlets to avoid the possibility of being burned by the hot oil.

Typical food steaming or boiling apparatus (food steamers) include a container for heating and boiling water and a basket for supporting food items to be boiled or steamed in the container. The basket typically has a handle that extends across the top of the basket and, like the prior art turkey fryers, exposes the user to hot steam or boiling water when inserting or removing the basket from the container.

When steaming food or frying turkeys, it is desirable, for proper cooking, to keep the food off of the bottom surface of the container. To accomplish this, prior art turkey and poultry fryers typically utilize a food support that has legs extending downwardly from the bottom of the food support. The legs serve to position the food support and the turkey in a spaced relation from the bottom of the fryer container within which the turkey and the food support are placed. Likewise, prior art food steamers also often provide a basket that has legs extending downwardly from the bottom of the basket. The disadvantage of having legs extending downwardly from the bottom of the food support/basket is that the user may, when inserting or removing the food support/basket from the fryer/steamer, mistakenly believe that the entire food support/basket has cleared the upper most part of the container, when in fact, a leg is still extending into the container or extending outside of the container. This exposes the user to the danger that a leg of the food support may catch on a lip or side wall of the container and cause the food support basket to tip and possibly spilling its food contents, or worse knock over the container and expose the user to the dangers of the spilled hot liquid of the container.

Prior art fryers and food steamers do not provide a means of draining the liquid contents from the container. To remove the liquid contents from the container, typical prior art fryers and food steamers require the user to pour the liquid contents of the container out of the top of the container, much like pouring water from a bucket. This method of removing the liquid contents of the container exposes the user to the dangers of spilling the contents and, if still hot, burning anyone who comes in contact with the spilled liquid.

SUMMARY OF THE INVENTION

The present invention overcomes the shortcomings of prior art fryers and food steamers by providing a cooking apparatus that minimizes the user's exposure to the hot contents of the cooking apparatus. The cooking apparatus of the present invention includes a food support that does not have legs extending downwardly from the food support and, therefore, does not expose the user to the potential dangers associated with the support legs protruding below the food support discussed above. Furthermore, the present invention also provides a cooking apparatus container with a spigot that allows the liquid contents to be safely drained without requiring the container to be tipped on its side to pour out the liquid contents.

In one embodiment, a cooking apparatus is provided that is adapted to be utilized with existing cooking containers that are suitable for high temperature heating of the desired cooking medium, such as oil or water. The cooking apparatus is dimensioned so that it may be easily inserted into and removed from the cooking container. The cooking apparatus includes a food support that has a horizontal member which is adapted for receiving and supporting food items placed thereon. Extending upwardly from the horizontal member is at least one vertical member having a top end. The top end has a support connector which is designed to be utilized to suspend the food support in the cooking container. A lid is provided that has a handle and a lid connector. The lid connector is complementary to and selectively connectable to the support connector. The user can selectively engage the lid connector with the support connector and use the lid to lift the food support and suspend the food support from the lid.

By utilizing a lid having a lid connector that is selectively connectable to the support connector, the user may insert or remove the food support from the cooking container using the lid. The lid provides protection for the user from the spattering of the hot liquid contents of the cooking container. The cooking apparatus of the invention thereby overcomes disadvantages of prior art fryers and food steamers.

In another embodiment, a cooking apparatus is provided with both a container and a food support. The container has a bottom surface and a side wall that extends upwardly from the container bottom surface to a top edge of the side wall. The container bottom surface and side wall define an interior of the container which is capable of holding the desired cooking medium, i.e. water or oil. The container is further capable of being heated to a high temperature for the cooking of food. The food support has a horizontal member which is adapted for supporting food items placed thereon. Extending upwardly from the horizontal member is at least one vertical member. The at least one vertical member has a support connector on it. However, in this embodiment, the support connector is designed and adapted to engage with the top edge of the container side wall and the container side wall top edge is adapted to engage with the support connector.

The at least one vertical member is dimensioned so that when the food support is placed within the container interior, the support connector engages with the side wall top edge and the horizontal member is suspended in spaced relation from the bottom surface of the container. By having the support connector engage with the side wall top edge in order to suspend the food support in a spaced relation from the container bottom surface, the necessity of having legs extending downwardly below the horizontal member is eliminated. Therefore, the present invention overcomes the previously discussed disadvantages of the prior art fryers and food steamers having food supports with legs.

This embodiment can also be provided with a lid for the container which has lid connectors on the lid. The lid connectors are adapted to be selectively connectable to the support connectors. This allows the food support to be inserted into and removed from the container interior by the lid, providing all the protective benefits of a lid, as mentioned above. Alternatively, the food support of the cooking apparatus can be raised and lowered by a pair of grab hooks of the type used in the prior art. The grab hooks can be selectively connectable to the support connector engaged over the side wall of the container. This enables the user to lower the food support into or remove the food support from the container interior while with minimal exposure to the hot contents of the container.

In yet another embodiment, the cooking apparatus includes a spigot attached to the container side wall and in communication with the container interior. The spigot has a valve member and a spout. The valve member is selectively positionable between an opened position and a closed position relative to the spigot. The spout is in communication with the spigot when the valve member is in the open position, thereby opening a flow path from the container interior through the spigot and the spout. When the valve member is in the closed position the spout is not in communication with the spigot and the valve member effectively closes the flow path from the container interior through the spigot and the spout. By having a spigot attached to the container side wall communicating with the container interior, the liquid content of the container can be selectively drained from the container interior in a controlled fashion. The use of the spigot overcomes the prior art disadvantage of requiring the contents of the container to be dumped or poured out of the container by tipping the container horizontally, much like pouring water out of a bucket. The spigot thereby reduces the dangers associated with removing hot liquid contents from the container.

Additionally, the spigot is provided with a stop which is connected to the spigot and extends outwardly from the spigot around the valve member. The stop is dimensioned and adapted to limit movement of the valve member beyond the opened position, and thereby prevents the valve member from being removed from the spigot which would result in uncontrolled discharge of the hot container contents through the spigot.

In another embodiment, the cooking apparatus includes a container and a lid. The container has a bottom surface and a side wall that extends upwardly from the container bottom surface to a top edge of the side wall. The container bottom surface and side wall define an interior of the container which is capable of holding the desired cooking medium, i.e. water or oil. The container is further capable of being heated to a high temperature for the cooking of food. The lid is dimension to fit over the container side wall top edge and has a handle. The lid also has a peripheral edge, a vertical central axis and opposite top and bottom surfaces. The top and bottom lid surfaces slant downwardly as the top and bottom lid surfaces extend radially inwardly from the peripheral edge toward the vertical central axis and form a central depression in the lid.

By utilizing a lid with a central depression, the lid provides a point for any liquids that accumulate on the lid bottom surface to drip off of the lid. The drip point promotes the removal of liquids from the lid bottom surface-and into the container when the lid is on or above the container and minimizes the possibility of uncontrolled liquid dripping off of the lid bottom surface in undesirable locations.

Thus, the present invention overcomes the disadvantages of the prior art fryers and food steamers.

BRIEF DESCRIPTION OF THE DRAWINGS

Further objectives and features of the present invention are set forth in the following detailed description of the preferred embodiment of the invention and in the drawing figures wherein.

DETAILED DESCRIPTION OF THE INVENTION

As used herein, words such as "horizontal" and "vertical" are not intended to be strictly construed in describing the invention. A "horizontal" member could have only a general horizontal configuration and a "vertical" member could have only a general vertical configuration.

Figure 1:
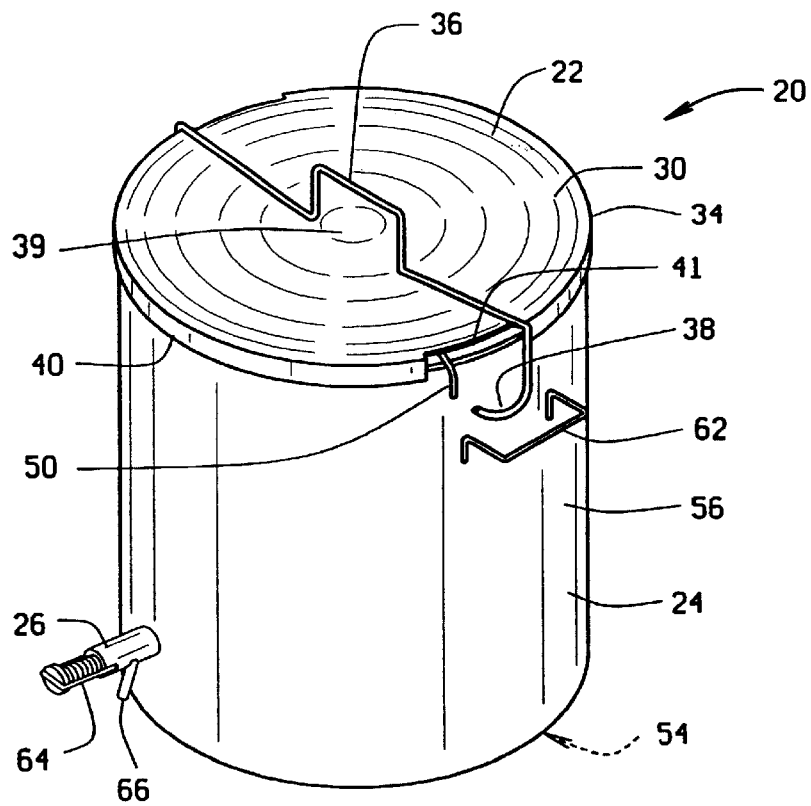
FIG. 1 is a perspective view of the cooking apparatus of the invention that is comprised of a container, a spigot, a lid, and a food support residing in the interior of the container.

FIG. 1 shows the cooking apparatus, generally indicated as 20, of the invention. The cooking apparatus 20 is basically comprised of a lid 22, a container 24, a spigot 26, and a food support 28, shown in FIG. 3. In the preferred embodiment, each of the component parts of the apparatus are constructed of metal.

In the preferred embodiment, the lid 22 is generally circular and has opposite top and bottom surfaces 30, 32, a center projection 33, a peripheral edge 34, a handle 36, and lid connectors 38. The lid 22 is dimensioned to fit on the container 24. The lid top and bottom surfaces 30, 32 slant downwardly as the lid top and bottom surfaces 30, 32 extend radially inwardly from the peripheral edge 34 toward the center projection 33. The slanting of the lid top and bottom surfaces 30, 32 form a central depression 39 in the lid 22. The central depression 39 and the center projection 33 are adapted to promote liquid on the lid bottom surface 32 to flow by gravity downwardly along the lid bottom surface 32 and toward the center projection 33 where the liquid will drip off of the lid bottom surface 32. The lid 22 also has a rim 40 that extends downwardly from the peripheral edge 34 beyond the lid bottom surface 32. The lid rim 40 extends around most of the peripheral edge 34 of the lid but is interrupted by a pair of notches 41 in the rim on opposite sides of the lid. The notches 41 in the lid rim are adapted to accommodate portions of the food support 28 in the container 24 in a manner yet to be described, while still providing a good fit between the lid 22 and the container 24. The notches 41 also allow steam or vapor to exit the container through the notches while cooking. Although, when using the cooking apparatus 20 to deep fry poultry, the lid 22 is typically not left on the container 24 while the poultry is being cooked. The handle 36 and the lid connectors 38 are formed from a single metal rod. The handle 36 is formed in a generally rectangular shape at the middle of the rod and the lid connectors 38 are formed as J-shaped hooks at opposite ends of the rod. The rod is secured to the lid top surface 30 by welding, riveting, or other equivalent means with the handle projecting perpendicularly upward from the lid top surface and the lid connectors 38 projecting downwardly from opposite sides of the lid adjacent ends of the notches 41 in the lid rim 40.

In the preferred embodiment, the food support 28 is generally cylindrical in shape and is adapted to support food items placed thereon. However, it is to be understood that the food support 28 could have other configurations such as rectangular, square, or any other shape without departing from the scope of the invention. In the preferred embodiment, the food support 28 has a colander type construction with a perforated, circular horizontal bottom member 42 and a perforated side wall 44 that extends upwardly from the periphery of the horizontal member 42. Two vertical members 46 on diametrically opposite sides of the food support 28 extend upwardly from the periphery of the horizontal member 42 beyond the perforated side wall 44 to top ends 48 that are formed as support connectors 50. The support connectors 50 are complementary to and selectively connectable to the lid connectors 38 to be described. In the preferred embodiment, the support connectors 50 are formed as inverted U-shaped hooks that extend radially outwardly from opposite sides of the food support.

While the food support 28 has been described in a specific embodiment, it should be understood that any number of vertical members 46 may extend upwardly beyond the perforated side wall 44 and each may have top ends 48 with integral support connectors 50. It should also be understood that the food support 28 may have a construction of a wire basket often used in deep frying foods.

Figure 4:
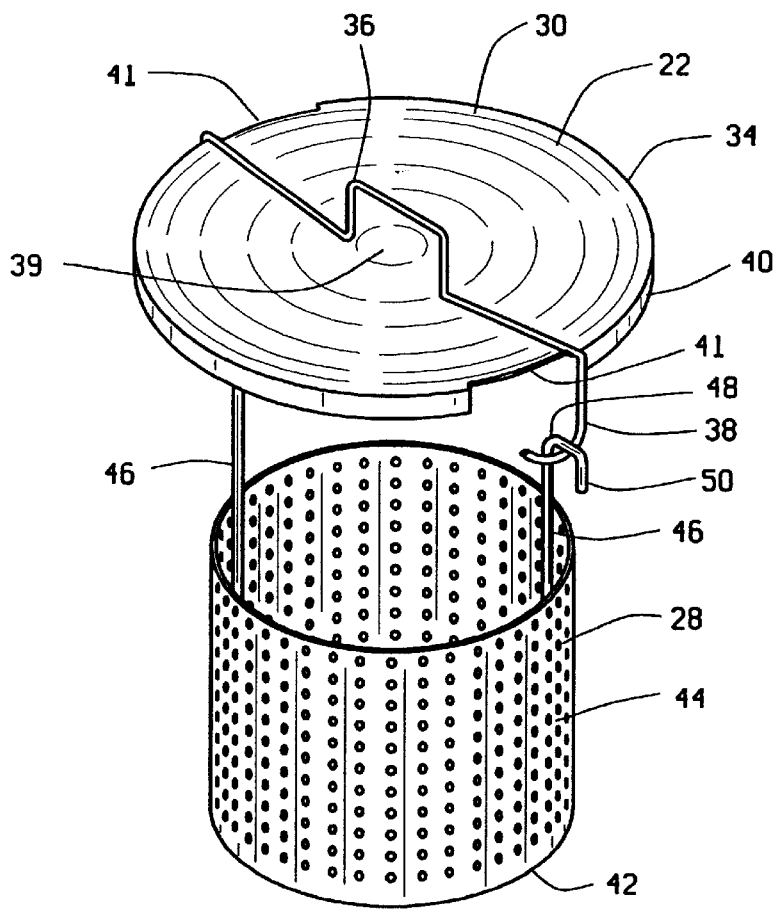
FIG. 4 is a perspective view of the food support being suspended from the lid.

As can be seen in FIG. 4, the food support 28 can be suspended from the lid 22 when the lid connectors 38 are connected to the support connectors 50. When the food support 28 is suspended from the lid 22 the user may insert or remove the food support 28 from the container 24 by the handle 36 on the lid 22. In this way, the lid 22 provides a shield that prevents the hot liquid contents of the container 24 from spattering onto the user's hand and arm.

As described above, in the preferred embodiment, the lid connectors 38 are J-shaped hooks and the food support connectors 50 are inverted U-shaped hooks that are complementary to the lid connectors. However, it is to be understood that the lid connectors 38 and the support connectors 50 can be of any complementary shapes that are selectively connectable to each other without departing from the scope of the invention. It is also to be understood that while the preferred embodiment is shown with two support connectors 50 and two lid connectors 38, there can be any number of lid connectors 38 and support connectors 50 without departing from the scope of the invention.

Figure 6:
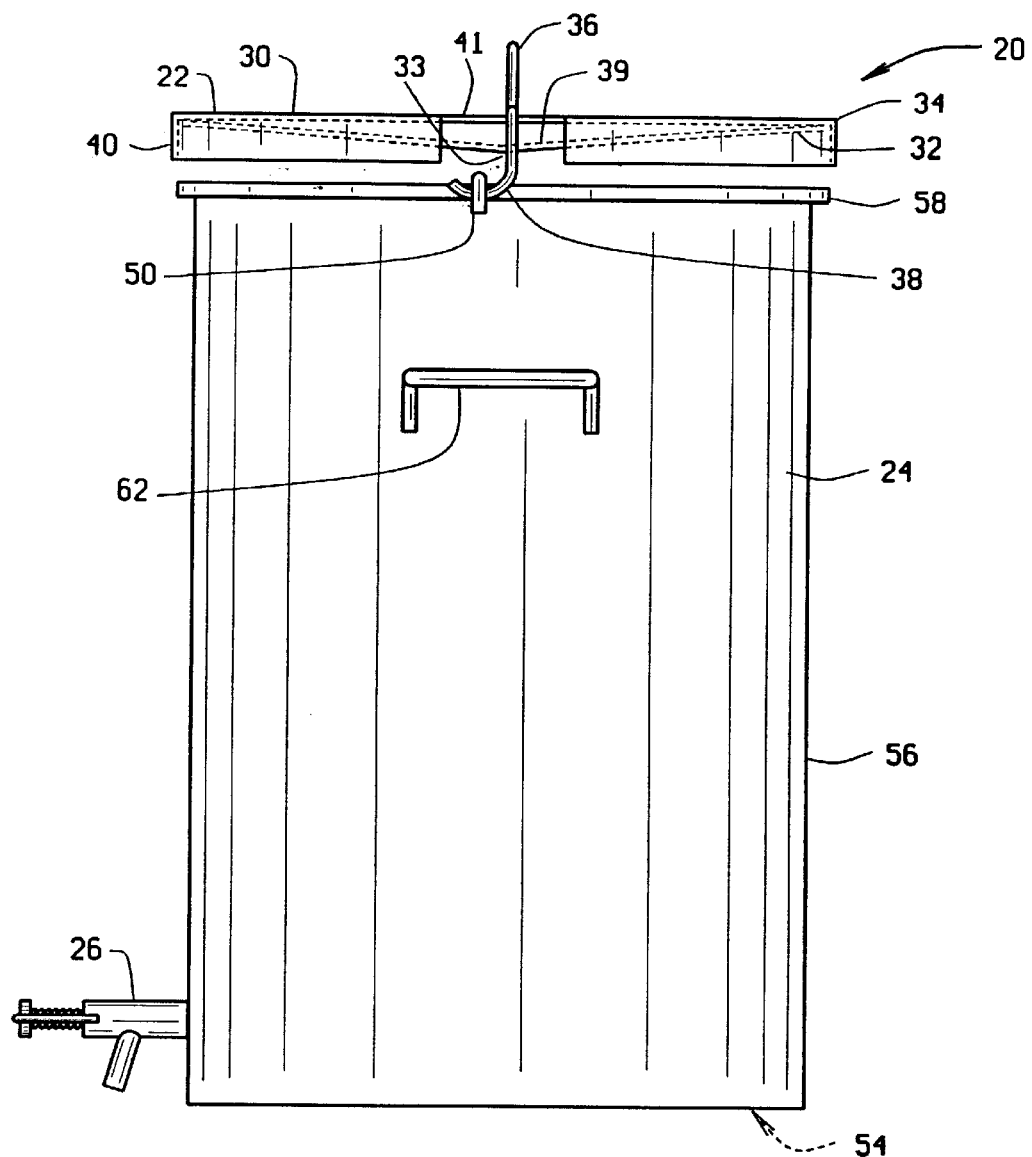
FIG. 6 is a side elevation view of the cooking apparatus of FIG. 1 showing the food support being suspended by the container rim and also engaged with the lid connectors.
Figure 7:
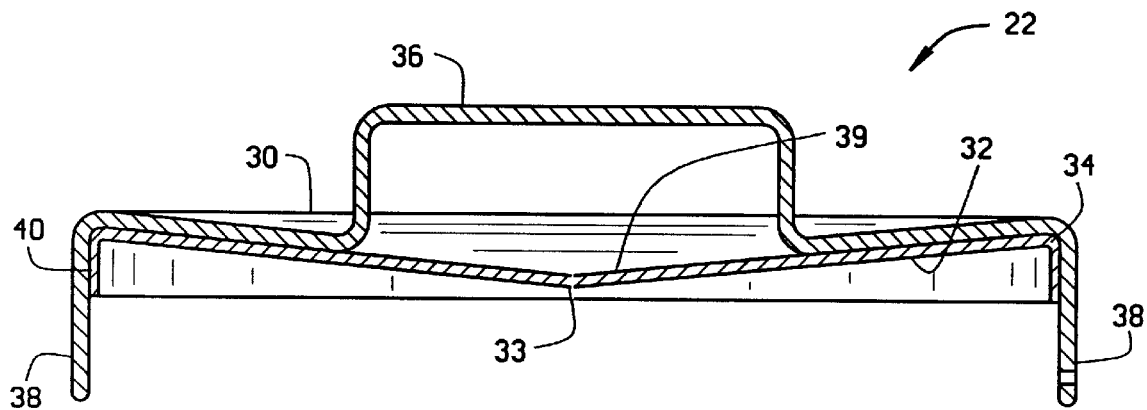
FIG. 7 is a cross-sectional view of the lid of FIG. 4 along line 7—7 without the food support.

In the preferred embodiment, the container 24 is generally cylindrical in shape and has a bottom surface 54 and a side wall 56 that extends upwardly from the bottom surface 54 to a top edge 58 of the side wall 56. The container bottom surface 54 and side wall 56 define an interior 60 of the container 24. The container 24 has handles 62 attached to opposite sides of the container side wall 56. The side wall top edge 58 is adapted to engage with the support connectors 50 on the food support 28 to suspend the food support in the container interior 60. When the food support 28 is placed in the container interior 60, the support connectors 50 engage with the side wall top edge 58, as shown in FIGS. 1 and 6, to suspend the food support 28 in a spaced relation from the bottom surface 54 of the container 24.

In the preferred embodiment, the container 24 has a spigot 26. The spigot 26 includes a valve member 64 and a spout 66. As can best be seen in FIG. 5, the spigot 26 has first and second ends 68, 70 and an interior passageway 72 that extends through the spigot 26 from the spigot first end 68 to the spigot second end 70. The spigot passageway 72 has internal screw threads 74 that extend along a portion of the spigot passageway 72 between the spigot first and second ends 68, 70. The spigot 26 is attached to the container side wall 56 at the spigot first end 68 near the container bottom surface 54. The spigot passageway 72 communicates with the container interior 60.

The spout 66 has an interior passageway 76 and opposite first and second ends 78, 80. The spout passageway at the first end 78 communicates with the spigot passageway 72 and the spout passageway at the second end 80 opens out of the spout 66.

The valve member 64 has internal screw threads 82 and opposite first and second ends 84, 86. The valve member screw threads 82 mate with the spigot passageway screw threads 74 and preferably both are fine threads to prevent leakage past the mating threads. A knob 88 is connected to the valve member second end 86. The valve member 64 is threaded into the spigot passageway 72 with the valve member first end 84 positioned in the spigot passageway 72 and the valve member second end 86 extending outwardly from the spigot second end 70. The engagement of the valve member threads 82 with the spigot passageway threads 74 allows the valve member 64 to be selectively rotated in the passageway and moved in opposite directions between opened and closed positions of the valve member in the spigot passageway 72 by turning the knob 88. As set forth above, the valve member threads 82 and the spigot passageway threads 74 are preferably finely threaded, however, any thread dimensions that can effectuate a leak tight engagement and prevent the flow of liquid oil or water past the threads is sufficient. The selective rotation of the valve member 64 causes the valve member 64 to move along the spigot passageway 72 between the spigot first and second ends 68, 70 and between opened and closed positions of the valve member 64 relative to the spigot 26.

Figure 2:
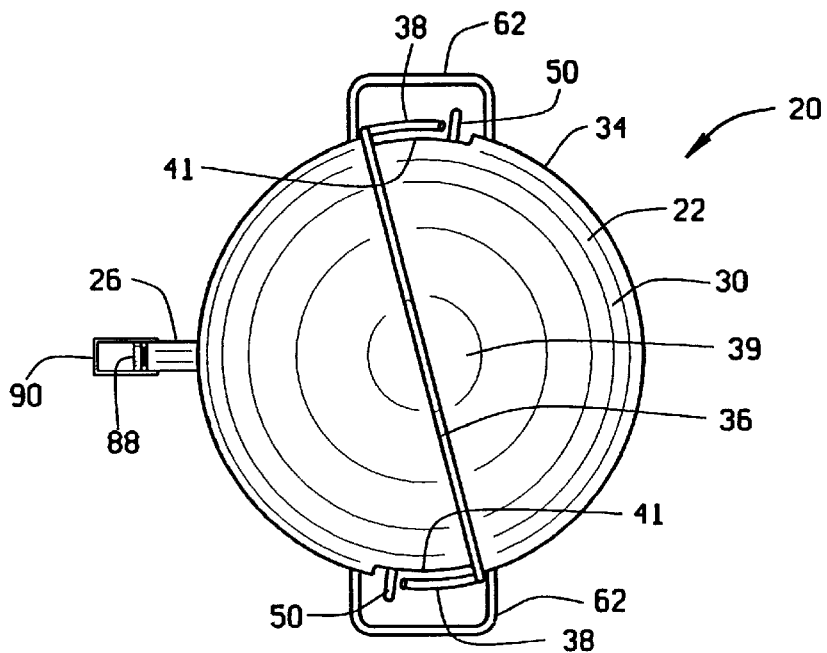
FIG. 2 is a top view of the cooking apparatus of FIG. 1.
Figure 3:
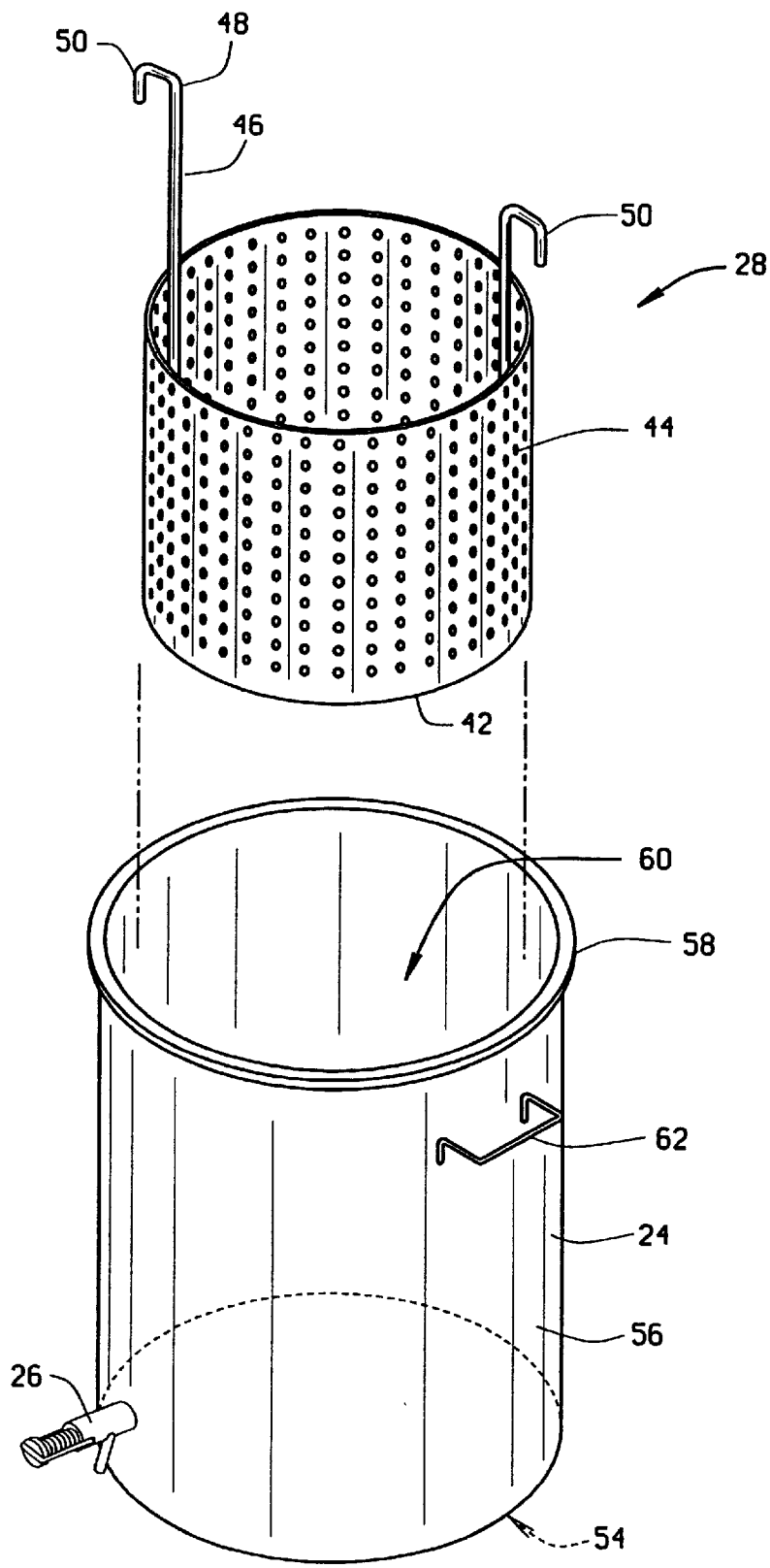
FIG. 3 is a perspective, exploded view of the container, spigot, and food support.
Figure 5:
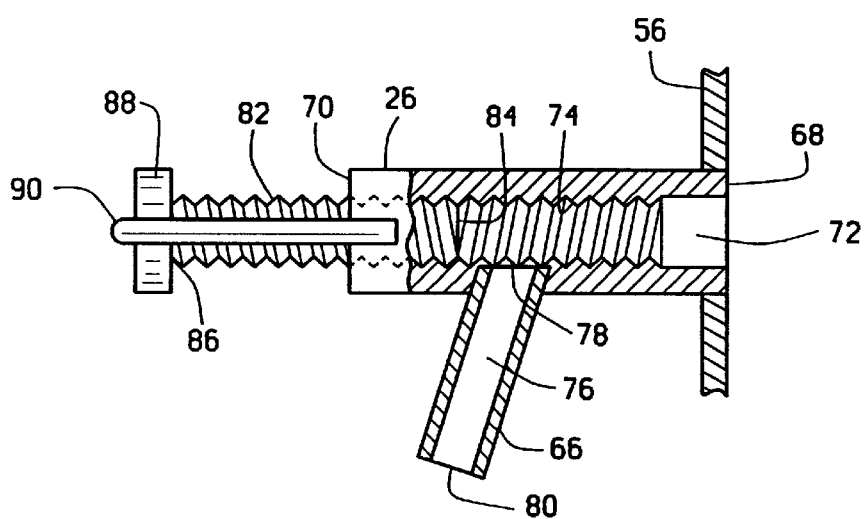
FIG. 5 is a cross-sectional side view of the spigot.

When the valve member 64 is in the opened position, as shown in FIGS. 1, 3 and 5, the valve member first end 84 is between the spout first end 78 and the spigot second end 70, thereby creating a flow path between the spout passageway 76, the spigot passageway 72, and the container interior 60. When the valve member 64 is in the closed position, as shown in FIG. 2, the valve member first end 84 is between the spout first end 78 and the-spigot first end 68, thereby closing the flow path and preventing communication between the spout passageway 76 and the spigot passageway 72.

In the preferred embodiment, a valve member stop 90 is connected to the spigot second end 70. The stop 90 extends outwardly from the spigot second end 70 around the valve member second end 86 and the knob 88. The stop 90 is dimensioned and adapted to limit the movement of the valve member 64 along the spigot passageway 72 to prevent the valve member first end 84 from being removed from the spigot passageway 72. While the stop 90 is shown as being "U" shaped and looping around the valve member knob 88, it is to be understood that any configuration of the stop 90 that prevents the valve member first end 84 from being removed from the spigot passageway 72 is sufficient.

In operation, the spigot 26 allows for the liquid contents of the container 24 to be selectively drained from the container interior 60. When the valve member 64 is in the opened position, the spout passageway 76 communicates with the spigot passageway 72 and the container interior 60, thereby allowing the liquid contents of the container 24 to flow through the spigot passageway 72 and the spout passageway 74. To close the valve member 64, when the valve member 64 is in the opened position, the user rotates the knob 88 with their thumb and forefinger in a clockwise direction, when looking along the spigot 26 toward the container 24, thereby causing the valve member 64 to move along the spigot passageway 72 toward the spigot first end 68. When the knob 88 is sufficiently rotated, the valve member 64 is in its closed position and prevents communication between the spigot passageway 72 and the spout passageway 76. When opening the valve member 64 from the closed position, the user rotates the knob 88 in a counter-clockwise direction, when looking along the spigot 26 toward the container 24, thereby causing the valve member 64 to move along the spigot passageway 72 toward the spigot second end 70. When the knob 88 contacts the stop 90, the valve member 64 is in the fully opened position and the spout passageway 76 communicates with the spigot passageway 72 and the container interior 60. The stop 90 prevents the continuing movement of the valve member 64 toward the spigot second end 70, thereby preventing the unintentional removal of the valve member 64 from the spigot passageway 72.

As set forth earlier, in the preferred embodiment, the cooking apparatus 20 is made out of metal, such as aluminum, carbon steel, or stainless steel and may contain a non-stick coating. However, it should be understood that any material of construction may be used that is safe for cooking food and capable of being heated to the high temperatures necessary for deep frying food.

In the preferred embodiment, the cooking apparatus 20 is provided with a food support 28 that has support connectors 50 that are dimensioned and adapted to engage with the container side wall top edge 58 and are selectively connectable with the lid connectors 38. In use, the user would fill the container interior 60 with the desired cooking medium, such as water or oil, and then heat the contents of the container 24 to the desired temperature by a heat source such as a gas burner. The user would then place the food items to be cooked in the food support 28. Next the user would take the lid 22 and connect the lid connectors 38 to the support connectors 50 of the food support 28, lift the food support 28 into a position above the container 24, and then lower the food support 28 into the container interior 60. The lid 22 provides a shield against spattering hot oil or water coming into contact with the user as the food support is lowered. As the food support 28 is being lowered into the container 24, the support connectors 50 engage with the side wall top edge 58 and suspend the food support 28 in a spaced relation from the container bottom surface 54. The user may then leave the lid 22 on the container 24, if desired, or remove the lid 22. To remove the lid 22, without removing the food support 28, the user would, after ensuring the support connectors 50 are fully engaged with and being suspended by the side wall top edge 58, rotate the lid 22 in a counterclockwise direction, when viewed from above, to disconnect the lid connectors 38 from the support connectors 50. The lengths of the lid rim notches 41 and the positions of the lid connectors 38 at the ends of the notches provide sufficient clearance for the food support connectors 50 when rotating the lid relative to the food support connectors. The user can then remove the lid 22 without removing the food support 28. When it is desired to remove the food support 28 from the container interior 60, the user would place the lid 22 on top of the container 24 with the food support connectors 50 positioned in the notches 41 opposite the lid connectors 38. The user then rotates the lid 22 clockwise, when viewed from above, to connect the lid connectors 38 to the support connectors 50. The user may then safely lift the lid 22 and the attached food support 28 from the container interior 60 with the lid 22 again providing a shield against hot oil or water coming in contact with the user. The user may then empty the contents of the container interior 60 by opening the valve member 64 of the spigot 26, as was discussed above.

While the present invention has been described by reference to specific embodiments, it should be understood that modifications and variations of the invention may be constructed without departing from the scope of the invention as defined by the following claims.

What is claimed is:

1. A cooking apparatus comprising:
 a container having a bottom surface and a side wall, the side wall extending upwardly from the bottom surface to a top edge of the side wall, the bottom surface and the side wall defining an interior volume of the container;
 at least one manual handle attached to the container side wall, the handle being adapted for manually carrying the container by the handle;
 a spigot attached to the container and communicating with the container interior, the spigot having a spout and a valve member, the valve member being selectively positionable between an opened position and a closed position relative to the spigot where in the opened position a flow path from the container interior volume through the spigot and spout is opened and in the closed position the flow path is closed; and a stop is positioned on the spigot where the stop will engage with the valve member as the valve member is moved away from the closed position and toward the opened position and thereby prevent further movement of the valve member away from the closed position.

2. The cooking apparatus of claim 1, wherein:
the spigot is mounted on the container side wall adjacent the container bottom surface.

3. A cooking apparatus comprising:
a container having a bottom surface and a side wall, the side wall extending upwardly from the bottom surface to a top edge of the side wall, the bottom surface and the side wall defining an interior volume of the container;
at least one manual handle attached to the container side wall, the handle being adapted for manually carrying the container by the handle;
a spigot attached to the container and communicating with the container interior, the spigot having a spout and a valve member, the valve member being selectively positionable between an opened position and a closed position relative to the spigot where in the opened position a flow path from the container interior volume through the spigot and spout is opened and in the closed position the flow path is closed;
the spigot has an interior passageway and internal screw threads along at least a portion of the interior passageway; and,
the valve member has external screw threads that are threaded into the internal screw threads of the spigot so that turning the valve member in opposite directions causes the valve member to move in opposite directions through the spigot interior passageway.

4. A cooking apparatus comprising:
a container having a bottom surface and a side wall, the side wall extending upwardly from the bottom surface to a top edge of the side wall, the bottom surface and the side wall defining an interior volume of the container;
at least one manual handle attached to the container side wall, the handle being adapted for manually carrying the container by the handle;
a spigot attached to the container and communicating with the container interior, the spigot having a spout and a valve member, the valve member being selectively positionable between an open position and a closed position relative to the spigot where in the opened position a flow path from the container interior volume through the spigot and spout is opened and in the closed position the flow path is closed;
the spigot has opposite first and second ends and an interior passageway that passes through the spigot and intersects the first and second ends; and, the spout projects from the spigot intermediate the spigot first and second ends and the spout has an interior passageway that communicates with the spigot interior passgway.

5. The cooking apparatus of claim 4, wherein:
the spigot interior passageway has internal screw threads that extend along at least a portion of the spigot interior passageway; and, the valve member has external screw threads that are threaded through the spigot second end and into the internal screw threads of the spigot whereby turning the valve member in a first direction causes the valve member to move through the spigot interior passageway toward the spigot first end and turning the valve member in an opposite second direction causes the valve member to move through the spigot interior passageway away from the spigot first end.

6. The cooking apparatus of claim 5, wherein:
a stop projects from the spigot second end to a position where the stop engages with the valve member as the valve member is moved away from the spigot first end and thereby prevents further movement of the valve member away from the spigot first end.

7. The cooking apparatus of claim 6, wherein:
the stop has a U-shaped configuration that projects from the spigot second end and loops around the valve member.

8. A cooking apparatus comprising:
a container having a bottom surface and a side wall, the side wall extending upwardly from the bottom surface to a top edge of the side wall, the bottom surface and the side wall defining an interior volume of the container;
a spigot attached to the container side wall, the spigot has opposite first and second ends and an interior passageway extending through the spigot between the first and second ends, at least a portion of the interior passageway has internal screw threading, the spigot is attached to the container side wall at the spigot first end and the spigot interior passageway communicates with the container interior volume;
a spout projecting from the spigot intermediate the spigot first and second ends, the spout has an interior passageway with opposite first and second ends, the spout interior passageway first end communicates with the spigot interior passageway and the spout interior passageway second end opens out of the spout;
a valve member having opposite first and second ends and external screw threads on at least a portion of the valve member, the valve member second end projects from the spigot second end and the valve member extends through the spigot second end into the spigot interior passageway, the external screw threads of the valve member engage with the internal screw threads of the spigot interior passageway whereby rotation of the valve member in a first direction moves the valve member first end through the spigot interior passageway toward the container to a closed position of the valve member where the valve member first end is positioned between the spigot first end and the spout, and rotation of the valve member in an opposite, second direction moves the valve member first end through the spigot interior passageway away from the container to an opened position of the valve member first end where the valve member first end is positioned between the spigot second end and the spout thereby opening communication from the container interior volume through the spigot interior passageway and the spout interior passageway.

9. The cooking apparatus of claim 8, wherein:
a stop is operatively attached to the container and is positioned where it engages with the valve member when the valve member is rotated in the second direction and thereby prevents further movement of the valve member first end away from the container.

10. The cooking apparatus of claim 9, wherein:
the stop is attached to the spigot.

11. The cooking apparatus of claim 8, wherein:
a stop projects from the spigot second end to a position where it engages with the valve member as the valve member is rotated in the second direction and thereby prevents further movement of the valve member first end away from the container.

12. The cooking apparatus of claim 11, wherein:
the stop has a U-shaped configuration that projects from the spigot second end and loops around the valve member.

13. The cooking apparatus of claim 11, wherein:
the stop is U-shaped and has opposite ends that are attached to opposite sides of the spigot and has an intermediate portion that loops around the valve member second end projecting from the spigot second end.

14. The cooking apparatus of claim 8, wherein:
the container is transportable and has at least one handle for manually carrying the container.

15. A cooking apparatus comprising:
a container having a bottom surface and a side wall, the side wall extending upwardly from the bottom surface to a top edge of the side wall, the bottom surface and the side wall defining an interior of the container;
a spigot attached to the container side wall and in communication with the container interior, the spigot having a valve member and a spout, the valve member being selectively positionable between an opened position and a closed position relative to the spigot, the spout being in communication with the spigot when the valve member is in the opened position opening a flow path from the container interior through the spigot and the spout, and the spout not being in communication with the spigot when the valve member is in the closed position closing the flow path from the container interior through the spigot and the spout; and
a valve stop located on an exterior of the spigot and preventing the removal of the valve member from the spigot.

16. The cooking apparatus of claim 15, wherein:
the spigot has first and second ends and a threaded interior passageway extending through the spigot between the first end and the second end, the spigot is attached to the container side wall at the spigot first end and the spigot passageway communicates with the container interior;
the spout has an interior passageway having first and second ends, the spout passageway first end communicates with the spigot passageway, the spout passageway second end opens out of the spout;
the valve member is threaded and has opposite first and second ends, the valve member is threaded in the spigot passageway with the valve member second end extending outwardly from the spigot second end, the threads of the valve member engage with the threads of the spigot passageway allowing the valve member to be selectively rotated in opposite directions within the spigot passageway, the selective rotation of the valve member causing the valve member to move along the spigot passageway between the first and second spigot ends and between closed and opened positions of the valve member relative to the spigot with the closed position being when the valve member first end is between the spout first end and the spigot first end thereby preventing communication between the spout passageway and the spigot passageway, the opened position being when the valve member first end is between the spout first end and the spigot second end thereby allowing communication between the spout passageway and the spigot passageway; and
the valve member stop is connected to the spigot second end and extends outwardly from the spigot second end, the stop being dimensioned and adapted to limit the movement of the valve member along the spigot passageway thereby preventing the valve member from being removed from the spigot passageway second end.

17. The cooking apparatus of claim 16, wherein:
the valve member stop is U-shaped and loops around the valve member second end.

18. The cooking apparatus of claim 15, wherein:
the container is transportable and has at least one handle for manually carrying the container.

19. A cooking apparatus comprising:
a food support having a horizontal member and at least one vertical member, the horizontal member being adapted for supporting a food item thereon, the at least one vertical member extending upwardly from the horizontal member and having a support connector;
a container having a bottom surface and a side wall, the side wall extending upwardly from the bottom surface to a top edge of the side wall, the bottom surface and the side wall defining an interior of the container, the side wall top edge being adapted to engage with the at least one vertical member support connector to suspend the food support proximate the bottom surface of the container when the food support is within the container interior; and
a spigot attached to the container side wall and in communication with the container interior, the spigot having a valve member and a spout, the valve member being selectively positionable between an opened position and a closed position relative to the spigot, the spout being in communication with the container interior when the valve member is in the opened position opening a flow path from the container interior through the spigot and the spout, and the spout not being in communication with the container interior when the valve member is in the closed position closing the flow path from the container interior through the spigot and the spout.

20. The cooking apparatus of claim 19, further comprising:
a manual handle with a lifting hook, the lifting hook being complementary to and connectable to the vertical member support connector to enable the food support to be lifted into and out of the container interior without requiring a user of the lifting hook to reach over the container interior.

21. The cooking apparatus of claim 20, wherein:
the manual handle and the lifting hook are on a lid of the container.

22. The cooking apparatus of claim 19, wherein:
the at least one food support vertical member is one of a plurality of vertical members, the plurality of vertical members each having support connectors complementary to and connectable to the side wall top edge to suspend the food support proximate the bottom surface of the container when the food support is within the container interior.

23. The cooking apparatus of claim 22, wherein:

the support connectors are each generally inverted "U" shaped hooks.

24. The cooking apparatus of claim 23, further comprising:

a pair of lifting hooks, the pair of lifting hooks being complementary to and connectable to the plurality of support connectors to enable the food support to be lifted into and out of the container interior without requiring a user to reach over the container interior.

25. The cooking apparatus of claim 22, wherein:

the food support horizontal member is perforated and has a peripheral edge, and a perforated side wall extends upwardly from the horizontal member peripheral edge, the perforated side wall and the perforated horizontal member defining an interior of the food support.

26. The cooking apparatus of claim 19, further comprising:

a lid dimensioned to fit over the container top edge, a handle on the lid, and at least one lid connector on the lid;

the at least one lid connector being complementary to and connectable to the vertical member support connector, thereby allowing the food support to be inserted into and removed from the container interior by the lid.

27. The cooking apparatus of claim 26, wherein:

the lid has a peripheral edge, opposite top and bottom surfaces, and a vertical central axis, the lid top and bottom surfaces slanting downwardly as the lid top and bottom surfaces extend radially inwardly from the peripheral edge toward the central axis to form a central depression in the lid.

28. The cooking apparatus of claim 27, wherein:

the central depression is conical.

* * * * *